(12) United States Patent
Tani

(10) Patent No.: US 8,434,945 B2
(45) Date of Patent: May 7, 2013

(54) SIDE PRESSURE APPLYING MECHANISM FOR MOTOR

(75) Inventor: Kazuumi Tani, Nagano (JP)

(73) Assignee: Nidec Sankyo Corporation (JP)

( * ) Notice: Subject to any disclaimer, the term of this patent is extended or adjusted under 35 U.S.C. 154(b) by 312 days.

(21) Appl. No.: 12/987,497

(22) Filed: Jan. 10, 2011

(65) Prior Publication Data

US 2011/0170816 A1     Jul. 14, 2011

(30) Foreign Application Priority Data

Jan. 13, 2010    (JP) ................................ 2010-004499

(51) Int. Cl.
     *F16C 27/00*     (2006.01)
     *G11B 17/02*     (2006.01)

(52) U.S. Cl.
     USPC ........................... 384/37; 360/99.08; 720/697

(58) Field of Classification Search .................. 384/215, 384/218, 219, 223, 37; 310/90; 360/99.04, 360/99.07, 99.08; 720/695–698
See application file for complete search history.

(56) References Cited

U.S. PATENT DOCUMENTS 4,730,299 A * 3/1988 Kamoshita et al. ........... 369/264
6,259,581 B1 * 7/2001 Sawada ....................... 360/99.04
7,211,917 B2 * 5/2007 Akabane ................... 310/154.03
2002/0190599 A1 * 12/2002 Akabane ....................... 310/232

FOREIGN PATENT DOCUMENTS

| JP | 8-87825 A | 4/1996 |
|---|---|---|
| JP | 2002-374651 A | 12/2002 |

\* cited by examiner

*Primary Examiner* — Phillip A Johnson
(74) *Attorney, Agent, or Firm* — Cantor Colburn LLP

(57) ABSTRACT

A side pressure applying mechanism for a motor may include a rotation shaft of the motor rotatably supported through a support bearing, a side pressure bearing which is loosely fitted to the rotation shaft, an urging member which is abutted with the side pressure bearing to apply a side pressure to the rotation shaft, engaging parts which are formed in a frame and with which both end portions of the urging member are respectively engaged, and a restricting part for restricting movement of the urging member toward the axial direction of the rotation shaft. The restricting part is provided at a position nearer to an abutting position where the urging member is abutted with the side pressure bearing between an engaging position where the urging member is engaged with the engaging part and the abutting position of the urging member with the side pressure bearing.

14 Claims, 4 Drawing Sheets

SIDE PRESSURE APPLYING MECHANISM FOR MOTOR

CROSS REFERENCE TO RELATED APPLICATION

The present invention claims priority under 35 U.S.C. §119 to Japanese Application No. 2010-4499 filed Jan. 13, 2010, the entire content of which is incorporated herein by reference.

FIELD OF THE INVENTION

At least an embodiment of the present invention may relate to a side pressure applying mechanism for a motor. More specifically, at least an embodiment of the present invention may relate to a mechanism in which a pressure (side pressure) is applied to a rotation shaft of a motor for rotationally driving a disk-shaped recording medium such as a CD or a DVD by an urging member in a direction intersecting an axial direction of the rotation shaft.

BACKGROUND

As a support bearing which rotatably supports a rotation shaft of a motor (hereinafter, may be simply referred to as a "bearing") in a motor device for rotating a disk-shaped recording medium, an oil-impregnated sintered bearing which is capable of rotating the rotation shaft at a high speed without oil supply is often used. In order to smoothly rotate the rotation shaft which is supported by the oil-impregnated sintered bearing, a clearance that an oil film can be formed is required between the rotation shaft and an inner peripheral face of the bearing. However, the rotation shaft may rattle due to the clearance and thus a turntable on which a disk-shaped recording medium is placed may be vibrated. The vibration of the turntable causes a reading error (so-called sound skipping or the like) on a signal recording face of a disk-shaped recording medium in an optical pickup device or a magnetic head device on which the motor device is mounted. Especially, in an optical pickup device which is mounted on a vehicle, since vibration is applied to the vehicle itself, a reading error may be often occurred.

In order to prevent this problem, for example, as described in Japanese Patent Laid-Open No. Hei 8-87825 and Japanese Patent Laid-Open No. 2002-374651, a structure has been known in which a side pressure is applied to the rotation shaft of the motor in a direction intersecting an axial direction of the motor as a means for restraining vibration of the rotation shaft during driving of the motor. According to this type of the side pressure applying mechanism for a motor, an urging member (torsion coil spring in the former Patent Literature and a wire spring in the latter Patent Literature) is abutted with an outer peripheral face of a side pressure bearing (ring member in the former Patent Literature and slip ring in the latter Patent Literature) so that a pressing urging force is applied to the side pressure bearing in a direction intersecting the axial direction and, as a result, a side pressure is applied to the rotation shaft through the side pressure bearing. In this manner, since the rotation shaft is pressed against the inner peripheral face of the oil-impregnated sintered bearing, rattling of the rotation shaft due to the clearance is restrained and occurrence of a reading error caused by vibration of the turntable is prevented.

In the side pressure applying mechanism for a motor described in the former Patent Literature, the urging member (torsion coil spring) is abutted with the outer peripheral face of the side pressure bearing (ring member) to urge the side pressure bearing in a direction substantially perpendicular to the axial direction of the rotation shaft. However, in a case that this structure is used in an optical pickup device for a vehicle or the like, when the urging member which is abutted with the outer peripheral face of the side pressure bearing is moved up and down in the axial direction of the rotation shaft of the motor by a disturbance such as a sudden impact, the urging member is disengaged from the outer peripheral face of the side pressure bearing and, for example, the urging member may climb on an upper face of the side pressure bearing (hereinafter, the state where the urging member has climbed on the upper face of the side pressure bearing may be simply described as "climbing of the urging member (on the side pressure bearing)".

On the other hand, in the latter Patent Literature, a structure is described in which a protruded part that is protruded from an upper end part to an outer side in a radial direction is formed on the side pressure bearing (slip ring). According to this structure, the urging member (wire spring) which is abutted with the outer peripheral face of the side pressure bearing is located under the protruded part and thus the climbing of the urging member on the side pressure bearing can be prevented. However, in this structure, since the urging member is caught by the protruded part of the side pressure bearing, when the urging member is moved up and down by a disturbance such as a sudden impact, the side pressure bearing is also moved up and down together with the urging member (the urging member moves so as to lift the side pressure bearing up), which may cause a situation that the side pressure bearing is abutted with the turntable to occur an abnormal noise. Further, the protruded part is difficult to secure a sufficient strength and a cost for forming the side pressure bearing is increased.

SUMMARY

In view of the problems described above, at least an embodiment of the present invention may advantageously provide a side pressure applying mechanism for a motor in which a side pressure is applied to the rotation shaft of the motor by an urging member through a side pressure bearing and in which, even when a disturbance such as a sudden impact occurs, the urging member is surely maintained in an abutting state with the side pressure bearing.

According to at least an embodiment of the present invention, there may be provided a side pressure applying mechanism for a motor including a rotation shaft of the motor which is rotatably supported through a support bearing, a side pressure bearing which is loosely fitted to the rotation shaft, an urging member which is abutted with an outer peripheral face of the side pressure bearing to apply a side pressure to the rotation shaft in a direction intersecting an axial direction, engaging parts which are formed in a frame to which the motor is fixed and with which both end portions of the urging member are respectively engaged, and a restricting part for restricting movement of the urging member toward the axial direction of the rotation shaft, and the restricting part is provided at a position nearer to an abutting position where the urging member is abutted with the side pressure bearing between an engaging position where the urging member is engaged with the engaging part and the abutting position of the urging member with the side pressure bearing. Specifically, it may be structured that the engaging parts with which both end portions of the urging member are respectively engaged are formed on outer sides with respect to a motor case that structures the motor, and the restricting part is formed on an inner side with respect to a half position of an outer diameter of the motor case.

According to the side pressure applying mechanism for a motor in accordance with the present invention, a restricting part for restricting movement of the urging member toward the axial direction of the rotation shaft within a predetermined range is provided at a position nearer to an abutting position where the urging member is abutted with the side pressure bearing. Therefore, the urging member abutted with an outer peripheral face of the side pressure bearing is prevented from easily climbing on the side pressure bearing and thus, even when a disturbance such as a sudden impact occurs, the urging member is surely maintained in an abutting state with the side pressure bearing. When the side pressure applying mechanism as described above is adopted, a superior motor device with a high degree of quality and without being affected by a disturbance such as a sudden impact is obtained.

In accordance with an embodiment of the present invention, the restricting part is formed by means of that a part of the frame is cut and bent.

According to this structure, the restricting part can be formed by press working. In other words, a structure required as an attaching member for the motor (for example, attaching holes for the motor) and a structure required as a restricting member for restricting movement of the urging member (restricting part) are formed with one step and thus increase of the manufacturing cost is restrained.

In accordance with an embodiment of the present invention, the restricting part is bent from the frame on the same side as the rotation shaft with respect to the urging member, and a tip end portion of the restricting part is formed toward a side opposite to an applying direction of the side pressure by the urging member. For example, it may be structured that the restricting part is formed so that the tip end portion is formed toward an outer side in a radial direction of the rotation shaft.

According to this structure, the urging member which is abutted with the outer peripheral face of the side pressure bearing may be attached in such a manner that the urging member is turned from the outer side of the rotation shaft. When the tip end portion of the restricting part which is cut and bent is formed toward the outer side in the radial direction of the rotation shaft, the opening of the restricting part is directed toward the outer side in the radial direction of the rotation shaft and thus the urging member which is to be attached from the outer side of the rotation shaft is easily attached.

In accordance with an embodiment of the present invention, the restricting part is bent from the frame on an opposite side to the rotation shaft with respect to the urging member, and a tip end portion of the restricting part is formed toward the same side as an applying direction of the side pressure by the urging member. For example, it may be structured that the restricting part is formed so that the tip end portion is formed toward an inner side in a radial direction of the rotation shaft.

According to this structure, since the tip end portion of the restricting part which is cut and bent is formed toward the same side as the applying direction of the side pressure by the urging member, the urging member is attached between the restricting part and the side pressure bearing. Therefore, once the urging member has been attached to the frame, the urging member is hard to be detached from the frame and thus, even when a disturbance such as a sudden impact occurs, the urging member is surely maintained in an abutting state with the side pressure bearing.

In accordance with an embodiment of the present invention, when the tip end portion of the restricting part is formed toward the same side as the applying direction of the side pressure by the urging member, it is preferable that the restricting part is formed so that an outer face of the restricting part is inclined toward the tip end of the restricting part.

According to this structure, in a case that the tip end portion of the restricting part, i.e., the opening of the restricting part is directed toward the same side as the applying direction of the side pressure by the urging member, for example, when the opening of the restricting part is directed toward the inner side in the radial direction of the rotation shaft, since the urging member can be slid on the inclined outer face of the restricting part to be interposed between the side pressure bearing and the restricting part and thus the urging member is easily attached to the frame. In addition, once the urging member has been attached to the frame, the urging member is further hard to be detached from the frame and thus, even when a disturbance such as a sudden impact occurs, the urging member is surely maintained in an abutting state with the side pressure bearing.

In addition, in accordance with an embodiment of the present invention, a tip end portion of the restricting part is formed with a detachment preventing part which is bent toward an opposite direction to a bending direction of the restricting part formed by bending the frame.

According to this structure, since the opening of the restricting part is narrowed by the detachment preventing part, the urging member having been attached is further hard to be detached from the frame and, even when a disturbance such as a sudden impact occurs, the urging member is surely maintained in an abutting state with the side pressure bearing.

In accordance with an embodiment of the present invention, a tip end portion of the restricting part is provided so as to permit movement of the urging member in the axial direction of the rotation shaft, and a movable distance of the urging member in the axial direction is set to be smaller than a distance with which the urging member climbs on the side pressure bearing when the urging member is moved in the axial direction of the rotation shaft. Specifically, it may be structured that the urging member is a wire spring which is formed of a metal wire, the side pressure bearing is provided with a large diameter part having a relatively large diameter and a small diameter part having a relatively small diameter which is formed on the large diameter part, and the wire spring is abutted with the small diameter part. In this case, it is preferable that the movable distance of the urging member in the axial direction which is restricted by the tip end portion of the restricting part is set to be smaller than a thickness in the axial direction of the small diameter part of the side pressure bearing.

According to this structure, the movable distance of the urging member in the axial direction of the rotation shaft is restricted by the tip end portion of the restricting part. Therefore, the urging member is not largely moved upward in the axial direction and thus the urging member is surely prevented from climbing on the side pressure bearing.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENTS

Figure 1:
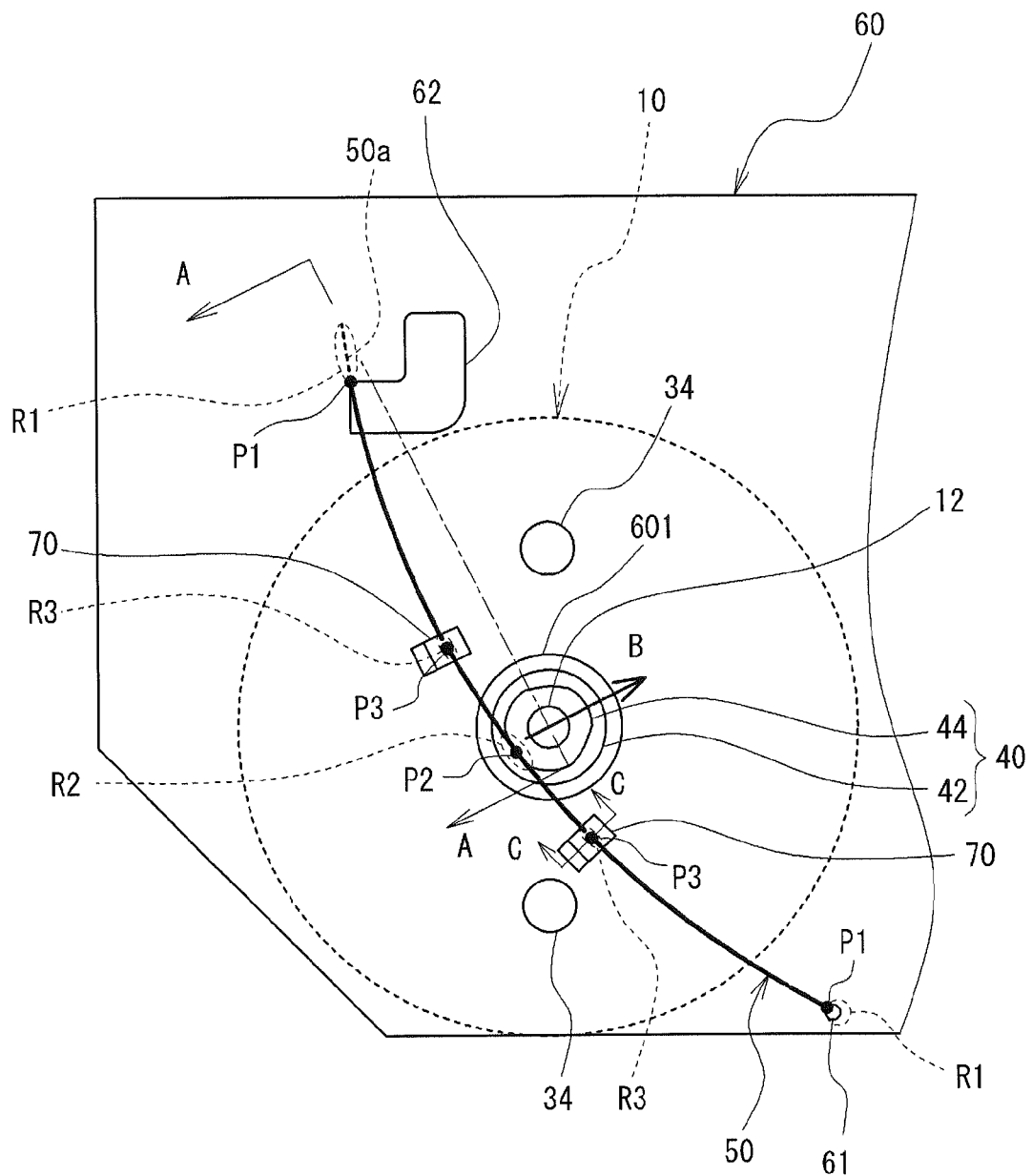
FIG. 1 is a plan view showing a motor device to which a side pressure applying mechanism for a motor is applied in accordance with an embodiment of the present invention.
Figure 2:
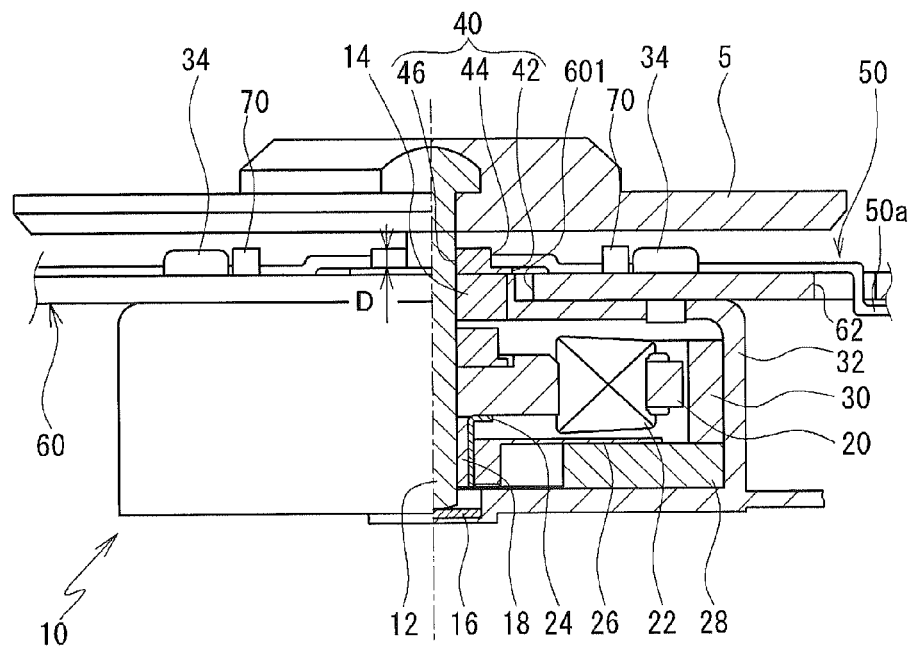
FIG. 2 is a partially cross-sectional side view showing a motor device to which a side pressure applying mechanism for a motor is applied in accordance with an embodiment of the present invention (cross-sectional view showing the motor device which is cut by the "A-A" line in FIG. 1).

An embodiment of the present invention will be described in detail below with reference to the accompanying drawings. FIG. 1 is a plan view showing a motor device 1 to which a side pressure applying mechanism for a motor is applied in accordance with an embodiment of the present invention. FIG. 2 is its partially cross-sectional side view (cross-sectional view showing the motor device 1 which is cut by the "A-A" line in FIG. 1). For convenience of description, a turntable 5 is detached in FIG. 1. Further, an up-and-down direction in the following description is an axial direction of a rotation shaft 12 of a motor 10 and, except a case specifically described, the up-and-down direction is the direction of the rotation shaft 12 in FIG. 2.

The motor device 1 is used for rotating the turntable 5 on which a disk-shaped recording medium is placed and the motor device 1 is mounted on a reproducing apparatus for a disk-shaped optical medium (for example, optical pickup device).

The side pressure applying mechanism for a motor which is provided in the motor device 1 is structured so that a side pressure bearing 40 is loosely fitted to the rotation shaft 12 of a motor 10 and a wire-shaped urging member 50 is abutted with an outer peripheral face of the side pressure bearing 40 to apply a pressing urging force in a direction intersecting the axial direction of the rotation shaft 12. In other words, in the side pressure applying mechanism for a motor, a side pressure is applied to the rotation shaft 12 in a direction intersecting the axial direction of the rotation shaft 12 by the abutted wire-shaped urging member 50 through the side pressure bearing 40. Specifically, the direction intersecting the axial direction is a direction substantially perpendicular to the axial direction in the present embodiment. When the side pressure is applied, since the rotation shaft 12 is pressed against the inner peripheral face of a support bearing 14, rattling of the rotation shaft 12 due to the clearance between the rotation shaft 12 and the support bearing 14 is restrained. Respective structures will be specifically described below.

The motor 10 is a DC motor with brushes. A structure of the motor 10 will be described below with reference to FIG. 2. The motor 10 is comprised of a rotor member and a stator member. The rotor member is structured of a rotor core 20, a drive coil 22, a commutator 24, a rotation shaft to which these members are fixed, and the like. Further, the stator member is structured of brushes 26, a magnet 30 fixed to the inner peripheral face of a motor case 32 and the like.

The rotation shaft 12 of the motor 10 is rotationally supported by the support bearing 14 which is an oil-impregnated sintered bearing that is fixed to the motor case 32. As shown in the drawing, the support bearing 14 is a radial bearing. A clearance between an inner peripheral face of the through hole of the support bearing 14 and an outer peripheral face of the rotation shaft 12 is set to be a size which is required to form at least an oil film so that frictional resistance occurred between the rotation shaft 12 and the support bearing 14 is reduced as much as possible for securing smooth rotation of the rotation shaft 12.

Further, a base end (lower end) of the rotation shaft 12 is supported by a thrust bearing 16. A core holder 18 made of an insulation member is fixed to the rotation shaft 12 and a plurality of rotor cores 20 (for example, six salient poles) is attached to the core holder 18. Drive coils 22 are wound around the respective rotor cores 20 by a predetermined number of turns. The respective drive coils 22 are electrically connected with the commutator 24 which is fixed on a base end side of the rotation shaft 12 through the core holder 18.

The commutator 24 is provided in an equally divided manner in correspondence with the pole number of the motor 10 (the number of salient poles of the rotor core 20) so as to surround the outer peripheral face of the core holder 18. In this embodiment, the outer peripheral face of the commutator 24 is equally divided in a circumferential direction with a slit formed at three positions and a commutator segment (not shown) is disposed in each of the divided portions. An end of each of the drive coils 22 is electrically connected with each commutator segment respectively.

A pair of brushes 26 (one is shown but the other is not shown) which slide on the outer peripheral face of the commutator 24 is fixed to the motor case 32 on an outer side of the commutator 24 in a state that the brushes 26 are buried in a brush holder 28 made of resin.

A magnet (permanent magnet) 30 is fixed to an inner peripheral face of the motor case 32 so as to face the rotor core 20 with a predetermined gap space. In this embodiment, the number of the salient poles of the rotor core 20 is six and the number of the magnetic poles of the magnet 30 is four.

In the motor 10 which is structured as described above, when an electric current is supplied to the drive coils 22 from a power supply part not shown through the brushes 26 and the commutator 24 (respective commutator segments), the rotation shaft 12 is rotated in a predetermined direction by a magnetic force generated between the drive coils 22 and the magnet 30.

The motor case 32 of the motor 10 is fixed to a metal frame 60 by using two screws 34 which are inserted into motor mounting holes (not shown). In this manner, the motor 10 is attached to an under face of the frame 60 in a tightly contacted state. A through hole 601 is formed in the frame 60 and the rotation shaft 12 of the motor 10 is protruded upward through the through hole 601.

The side pressure bearing 40 is loosely fitted to the rotation shaft 12 which is protruded from the frame 60. In other words, the side pressure bearing 40 is supported by the rotation shaft 12 in a state that the side pressure bearing 40 is capable of smoothly sliding up and down along the rotation shaft 12 but does not rattle largely. The side pressure bearing 40 is placed on the support bearing 14. In addition, a tip end of the rotation shaft 12 is fixed with a turntable 5 on which a disk-shaped recording medium is placed. Therefore, the rotation shaft 12 and the turntable 5 are rotated together. As shown in FIG. 2, the side pressure bearing 40 which is loosely fitted to the rotation shaft 12 is located at a position where the side pressure bearing 40 is protruded from the frame 60.

The side pressure bearing 40 is, similarly to the support bearing 14, a bearing member made of oil impregnated sintered metal, which is provided with a large diameter part 42 whose outer peripheral size is relatively large and a small diameter part 44 having a relatively small diameter that is formed on the large diameter part 42. A through hole 46 is formed at a center of the side pressure bearing 40 for inserting the rotation shaft 12. As shown in FIG. 1, a cross sectional shape of the small diameter part 44 is a shape in which three portions of a circular shape are cut out with 120 degrees interval. The cut-out part is formed so that an abutting area of the urging member 50 with an outer peripheral face of the small diameter part 44 is increased and that an urging force of the urging member 50 abutted with the outer peripheral face of the small diameter part 44 is surely applied to the side pressure bearing 40.

The urging member 50 is a so-called wire spring which is formed of a metal wire having a predetermined diameter and attached so that both end portions of the wire spring are respectively engaged with a first engaging part 61 and a second engaging part 62 which are provided in the frame 60. The first engaging part 61 and the second engaging part 62 are respectively formed at outer positions with respect to an outer peripheral face of the motor case 32. In the following description, an engaging part of the urging member 50 which is engaged first when the urging member 50 is to be attached is the first engaging part 61 and the other engaging part which is next engaged is the second engaging part 62. Structures of the first and the second engaging parts 61 and 62 will be described below.

The urging member 50 whose both end portions (portions "R1" in FIG. 1) are engaged with the first engaging part 61 and the second engaging part 62 is abutted with the outer peripheral face of the side pressure bearing 40 at its roughly center portion in a state that the urging member 50 is bent like a bow. In this manner, the rotation shaft 12 is urged while pressed by the urging member 50 through the side pressure bearing 40 in a direction of the arrow "B" shown in FIG. 1. Further, as shown in FIG. 2, in this embodiment, the urging member 50 is formed in a bent shape having a stepped part such that a portion in a predetermined range including the abutting portion (roughly center portion) with the side pressure bearing 40 is placed on the large diameter part 42 of the side pressure bearing 40. In other words, when the urging member 50 is abutted with the outer peripheral face of the small diameter part 44, the urging member 50 is placed on the large diameter part 42. Therefore, an upward movement of the side pressure bearing 40 in the axial direction is restricted by the urging member 50 at the time of rotating operation of the motor 10. Especially, in an optical pickup device for on-vehicle or the like, the motor is used under an environment where vibration always occurs and thus the side pressure bearing 40 may be easily turned around the rotation shaft 12 and easily moved in the axial direction due to vibration. In order to prevent these situations, in this embodiment, turning around the rotation shaft 12 and movement in the axial direction of the side pressure bearing 40 are restricted by the urging member 50.

Figure 3:
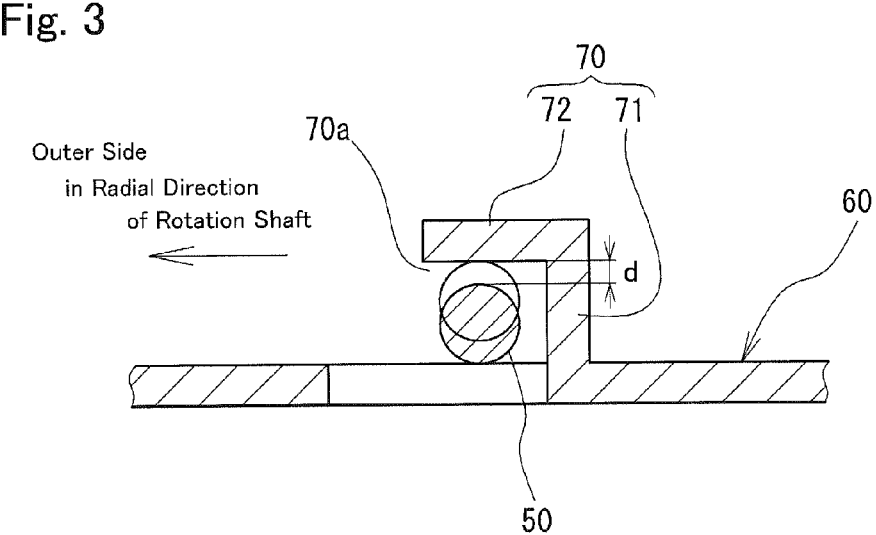
FIG. 3 is a cross-sectional side view showing a restricting part which structures the side pressure applying mechanism for a motor shown in FIGS. 1 and 2 (cross-sectional view showing the restricting part which is cut by the "C-C" line in FIG. 1).

An upward movement of the urging member 50 which is attached so as to urge the side pressure bearing 40 as described above is restricted in the axial direction of the rotation shaft 12 by two restricting parts 70 which are provided on the frame 60. A cross-sectional shape of the restricting part 70 (cross-sectional view showing the restricting part 70 which is cut by the "C-C" line in FIG. 1) is shown in FIG. 3. As shown in the drawing, the restricting part 70 is formed so that a part of the frame 60 is cut and bent in a direction so as to protrude from the upper face of the frame 60. Specifically, the restricting part 70 includes a wall part 71, which is cut and bent at a substantially right angle with respect to the plane direction of the frame 60, and an axial direction restricting part 72 which is bent at a substantially right angle from the wall part 71 and formed to be substantially parallel to the plane direction of the frame 60 for restricting the movement in the axial direction of the urging member 50. As described above, when the restricting part 70 is formed by using the frame 60 which is cut and bent, the restricting part 70 is formed by utilizing press working or the like. In other words, the restricting part 70 is capable of forming together with other structures, for example, a through hole 601, motor mounting holes to which a screw 34 for fixing the motor 10 is inserted and the like, which are formed in the frame 60 with one step. Therefore, increase of the manufacturing cost due to providing the restricting parts 70 can be restrained. In this embodiment, two wall parts 71 of the restricting parts 70 are disposed on the same sides as the small diameter part 44 of the side pressure bearing 40 with respect to the urging member 50 and the axial direction restricting part 72 is formed from the wall part 71 toward a side opposite to the side pressure bearing 40, in other words, toward a side opposite to the applying direction of the side pressure by the urging member 50.

As shown in FIG. 3, in a normal state, the urging member 50 urging the side pressure bearing 40 is contacted with the frame 60 but separated from the wall part 71 and the axial direction restricting part 72 which structure the restricting part 70. In this embodiment, the restricting part 70 restricts an upward movement of the urging member 50 in the axial direction within a predetermined range. Specifically, the predetermined range is a range (movable distance "d") from a state that the urging member 50 shown in FIG. 3 is contacted with the frame 60 (shown by the solid line with cross sectional slanted lines in FIG. 3) to a state that the urging member 50 is contacted with the axial direction restricting part 72 (shown by the solid line without slanted lines in FIG. 3). The movable distance "d" is set to be smaller than the thickness "D" (see FIG. 2) of the small diameter part 44 of the side pressure bearing 40 (relationship of "d<D" is satisfied) so that the roughly center portion of the urging member 50 (abutting portion with the side pressure bearing 40; portion shown by "R2" in FIG. 1) is not climbed on the side pressure bearing 40. According to this setting, the urging member 50 is not moved larger than the distance "d" upward in the axial direction and thus the roughly center portion of the urging member 50 is surely prevented from climbing on the side pressure bearing 40.

Strictly speaking, a portion of the urging member 50 whose movement is restricted in the predetermined range by the restricting parts 70 is only portions which are located under the restricting parts 70 (portions shown by "R3" in FIG. 1). In other words, there is a possibility that the abutting portion "R2" of the urging member 50 with the side pressure bearing 40 is moved larger than the movable distance "d" due to flexural rigidity, deformation or the like of the urging member 50 and, as a result, the abutting portion "R2" may be climbed on the side pressure bearing 40. In order to reduce this possibility, in this embodiment, the portions "R3" which are restricted by the restricting parts 70 (positions where the restricting parts 70 are formed) are set to be at positions nearer to the abutting portion "R2" between the portions "R1" of the urging member 50 which are engaged with the first engaging part 61 and the second engaging part 62 (engaging positions) and the abutting portion "R2" of the urging member 50 with the side pressure bearing 40 (abutting position). Specifically, the positions where the restricting parts 70 are bent and formed are set on inner sides in the radial direction with respect to half positions of an outer diameter of the motor case 32. In other words, the portions "R3" whose movements are restricted by the restricting parts 70 are set in the vicinity of the abutting portion "R2" with the side pressure bearing 40 as much as possible and, as a result, the possibility that the urging member 50 is climbed on the side pressure bearing 40 is reduced.

In this embodiment, "the position where the restricting part 70 is formed", "the engaging position" and "the abutting position" mean the following positions specifically. "The position where the restricting part 70 is formed" is a center position "P3" of the portion of the urging member 50 which is located under the restricting part 70 when the motor device 1 is viewed from an upper side as shown in FIG. 1. In other words, it is the point where an axial line of the urging member 50 intersects a center line by which a length of the restricting part 70 in a widthwise direction is divided into two portions. "The engaging position" is the position "P1" which is the nearest to the center (rotation shaft 12) side of the portion of the urging member 50 which is engaged with the first engaging part 61 or the second engaging part 62 when the motor device 1 is viewed from the upper side as shown in FIG. 1. "The abutting position" is the center position "P2" of the abutting portion of the urging member 50 with the side pressure bearing 40 when the motor device 1 is viewed from the upper side as shown in FIG. 1.

In the embodiment described above, only movement in the axial direction of the urging member 50 is restricted by the restricting part 70. However, a function may be provided in the wall part 71 for restricting movement of the urging member 50 in the radial direction of the rotation shaft 12 by means of that a formed position of the restricting part 70 is adjusted.

In addition, each of two restricting parts 70, specifically, the wall part 71 of the restricting part 70 is bent on the same side as the small diameter part 44 of the side pressure bearing 40 with respect to the urging member 50 and the axial direction restricting part 72 is formed so as to protrude from the wall part 71 toward a side opposite to the applying direction of the side pressure by the urging member 50. For example, as shown in FIG. 3, the tip end portion (opening 70a) of the restricting part 70 which is bent is formed toward an outer side in the radial direction of the rotation shaft 12 (turntable 5), in other words, in a separated direction from the shaft center of the rotation shaft 12. According to this structure, the urging member 50 is easily attached to the frame 60.

Figure 4A:
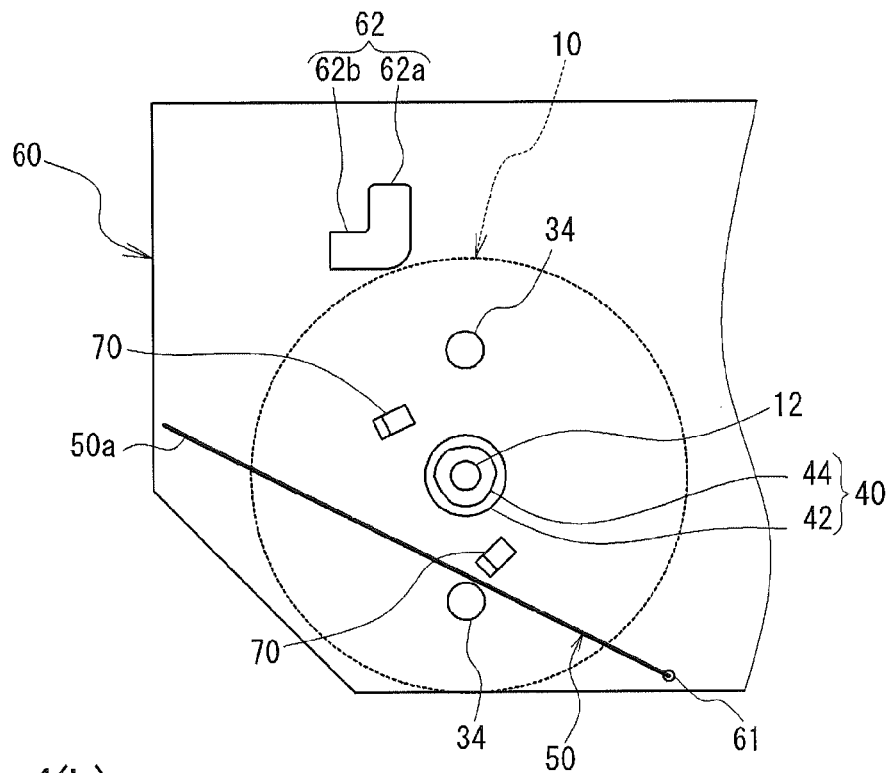
FIGS. 4(a) and 4(b) are plan views showing attaching steps to a frame of an urging member which structures the side pressure applying mechanism for a motor shown in FIGS. 1 and 2.
Figure 4B:
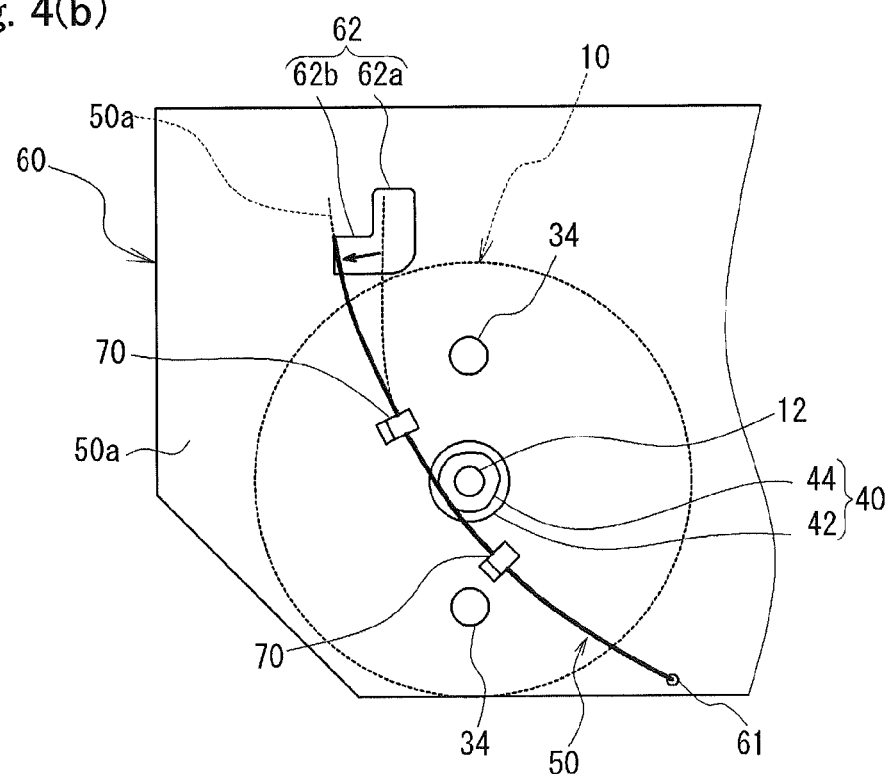

The reason of the easy attachment will be described below. FIGS. 4(a) and 4(b) are plan views showing attaching steps of the urging member 50 to the frame 60. First, as shown in FIG. 4(a), one end of the urging member 50 is inserted into the first engaging part 61 which is formed as a circular through hole in the frame 60 to be engaged by a certain method. Since the first engaging part 61 is an engaging part with which the urging member 50 is firstly engaged, any engaging structure may be utilized. For example, a method such as welding, fixing with a screw or caulking may be appropriately selected when the end of the urging member 50 is engaged with the frame 60 without rattling.

Next, as shown in FIG. 4(b), the other end 50a of the urging member 50 is turned around an outer side of the device to engage with the second engaging part 62. In this case, the urging member 50 is required to be abutted with the outer peripheral face of the side pressure bearing 40 and located so as to pass under the restricting parts 70. Therefore, when the opening 70a of the restricting part 70 is directed to the outer side in the radial direction of the rotation shaft 12, in other words, when the wall parts 71 of two restricting parts 70 are disposed on the same side as the small diameter part 44 of the side pressure bearing 40 with respect to the urging member 50 to be attached, the urging member 50 is easily set the state where the urging member 50 is passed under the restricting parts 70 by means of that the other end 50a of the urging member 50 is engaged with the second engaging part 62 from the outer side in the radial direction of the rotation shaft 12. In other words, when the urging member 50 is turned to be engaged with the second engaging part 62, the urging member 50 is located under the restricting parts 70.

The engaging structure of the second engaging part 62 is not limited to one specified example and may be appropriately selected in consideration of easy assembling or the like. In this embodiment, a substantially "L"-shaped through hole is adopted as the second engaging part 62. The through hole is formed of an elongated hole part 62a which is relatively long in the up-and-down direction in the drawing in FIG. 4(a) and a short hole part 62b which is relatively short in the up-and-down direction in the drawing. In order to correspond to this structure, the other end 50a of the urging member 50 is formed to be bent in a shape having a stepped part for a thickness of the frame 60 (see FIG. 2). When the other end 50a which is formed to be bent is inserted into the elongated hole part 62a and then released, the other end 50a is caught and engaged with the short hole part 62b by the elastic force of the urging member 50.

The restricting part 70 having the function as described above is formed on the frame 60 and is not formed on the side pressure bearing 40 itself and thus a malfunction that the side pressure bearing 40 is moved by the urging member 50 does not occur.

The following modified embodiments may be adopted for the restricting part described above in which the upward movement in the axial direction of the urging member 50 is restricted within a predetermined range.

Figure 5:
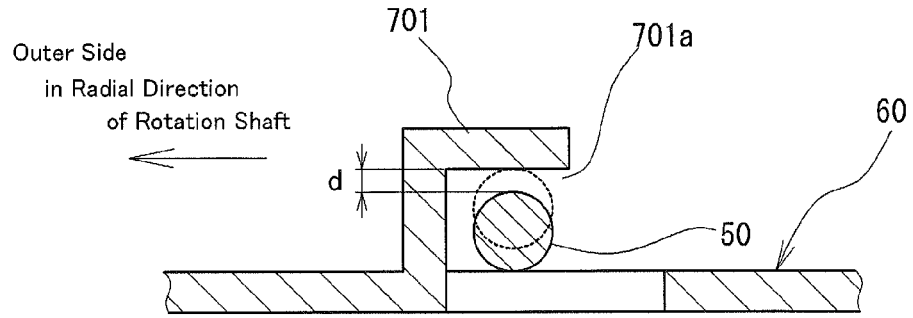
FIG. 5 is a cross-sectional side view showing a first modified embodiment of the restricting part shown in FIG. 3 (cross-sectional side view showing the restricting part which is cut by the "C-C" line in FIG. 1).

FIG. 5 is a cross-sectional view showing a restricting part 701 in accordance with a first modified embodiment ("C-C" line cross-sectional view in FIG. 1). The restricting part 701 is formed so that its tip end portion (opening 701a) which is bent is directed toward an inner side in the radial direction of the rotation shaft 12 (turntable 5), in other words, its tip end portion is directed toward a shaft center side in the radial direction of the rotation shaft 12. In other words, in the embodiment shown in FIG. 5, the wall part of the restricting part 701 is formed so that the urging member 50 is located between the small diameter part 44 of the side pressure bearing 40 and the wall part of the restricting part 701. Specifically, the wall part of the restricting part 701 is bent from a position on an opposite side to the rotation shaft 12 with respect to the urging member 50. Therefore, the axial direction restricting part which is a tip end portion of the restricting part 701 is formed to protrude toward the same side as the applying direction of the side pressure by the urging member 50. In other words, the axial direction restricting part of the restricting part 701 is formed from the wall part so as to protrude toward a side of the side pressure bearing 40.

According to this structure, the urging member 50 which has been attached to the frame 60 is interposed between the side pressure bearing 40 and the restricting parts 701 and thus the urging member 50 is further hard to be detached from the restricting parts 701.

Figure 6:
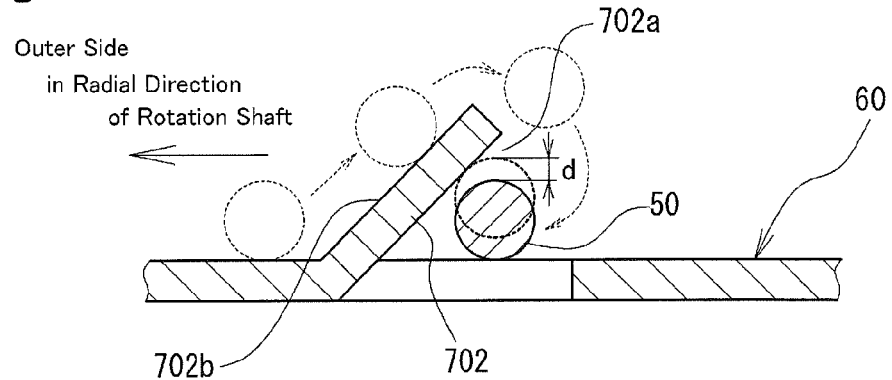
FIG. 6 is a cross-sectional side view showing a second modified embodiment of the restricting part shown in FIG. 3 (cross-sectional side view showing the restricting part which is cut by the "C-C" line in FIG. 1).

FIG. 6 is a cross-sectional view showing a restricting part 702 in accordance with a second modified embodiment ("C-C" line cross-sectional view in FIG. 1). The restricting part 702 is formed so that its tip end portion (opening 702a) which is cut and bent is directed toward an inner side in the radial direction of the rotation shaft 12 (turntable 5) and its outer face (upper face) 702b is inclined toward its tip end. Also in this case, the restricting part 702 is formed so that the urging member 50 is located between the small diameter part 44 of the side pressure bearing 40 and the restricting part 701.

According to this structure, similarly to the first modified embodiment, the urging member 50 having been attached to the fame 60 is interposed between the side pressure bearing 40 and the restricting parts 702 and thus the urging member 50 is further hard to be detached from the restricting parts 701.

In addition, the restricting part 702 in accordance with the second modified embodiment is provided with a function for easily attaching of the urging member 50. The reason of its easy attachment will be described below. The restricting part 702 is formed in a shape that its opening 702a is directed toward the inner side in the radial direction of the rotation shaft 12. Therefore, in comparison with the restricting part 70 which is formed so that its opening 70a is directed toward the outer side in the radial direction of the rotation shaft 12 as shown in FIG. 3, the urging member 50 is relatively hard to be attached. However, since the outer face 702b of the restricting part 702 is inclined toward the tip end, when the other end 50a of the urging member 50 is to be engaged with the second engaging part 62 as shown in FIG. 6, the urging member 50 is slid on the inclined outer face 702b to be interposed between the side pressure bearing 40 and the restricting part 702. In other words, in the restricting part 702 in accordance with the second modified embodiment, although the opening 702a is directed toward the inner side in the radial direction of the rotation shaft 12, the urging member 50 is relatively easy to be attached and, in addition, when the urging member 50 has been attached to the frame 60, the restricting part 702 is effective because the urging member 50 is hard to be detached from the frame 60.

In the embodiment described above, the restricting part 702 shown in FIG. 6 is formed so that its outer face 702b is inclined at a constant angle but the present invention is not limited to this embodiment. For example, the outer face 702b may be inclined in a circular arc shape in its cross sectional view and may be appropriately modified in consideration of easy attachment of the urging member 50.

Figure 7:
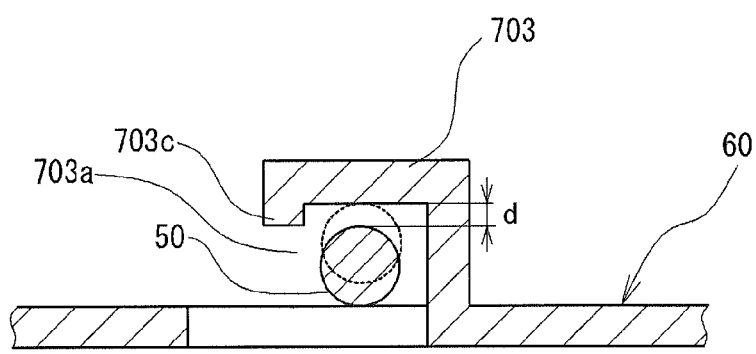
FIG. 7 is a cross-sectional side view showing a third modified embodiment of the restricting part shown in FIG. 3 (cross-sectional side view showing the restricting part which is cut by the "C-C" line in FIG. 1).

FIG. 7 is a cross-sectional view showing a restricting part 703 in accordance with a third modified embodiment ("C-C" line cross-sectional view in FIG. 1). The restricting part 703 is formed with a detachment preventing part 703c which is formed at its tip end so as to be bent in a direction opposite to the bent direction from the frame 60 (downward in the axial direction of the rotation shaft 12).

According to this structure, since the opening 703a of the restricting part 703 is narrowed by the detachment preventing part 703c, the urging member 50 having been attached so as to be located under the restricting part 703 is further hard to be detached from the frame 60.

The structure of the feature portion of the restricting part 703 (detachment preventing part 703c) in the third modified embodiment may be applicable to the restricting part even when its basic shape, the direction of the opening and the like are modified. In other words, the detachment preventing part 703c may be applicable to the restricting part 70 in the embodiment described above, and the restricting parts 701 and 702 in the first and second modified embodiments. Further, any structure that the tip end of the restricting part is bent downward in the axial direction of the rotation shaft 12 may be applicable to the restricting part. Further, "the direction opposite to the bent direction" means any direction in which the opening 703a is narrowed. In other words, when the tip end of the restricting part 703 is bent in a roughly downward direction, the opening 703a is narrowed. Therefore, the bent direction of the detachment preventing part 703c is not limited to the embodiment where the detachment preventing part 703c is bent downward in the axial direction of the rotation shaft 12 as shown in FIG. 7.

Although the present invention has been shown and described with reference to a specific embodiment, various changes and modifications will be apparent to those skilled in the art from the teachings herein.

For example, in the embodiments described above, the restricting part 70 (701-703) is provided at two positions which are nearer to the abutting position "P2" between the engaging positions "P1" of the urging member 50 which are engaged with the first engaging part 61 and the second engaging part 62 and the abutting position "P2" of the urging member 50 with the side pressure bearing 40. However, the restricting part 70 (701-703) may be provided at either one position. Further, the restricting part 70 (701-703) may be provided at three or more positions to further surely prevent the urging member 50 from climbing on the side pressure bearing 40.

Further, in the embodiments described above, a wire spring is used as the urging member 50 but a wire-shaped urging member such as a torsion coil spring may be utilized in the present invention.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A side pressure applying mechanism for a motor comprising:
    a rotation shaft of the motor which is rotatably supported through a support bearing;
    a side pressure bearing which is loosely fitted to the rotation shaft;
    an urging member which is abutted with an outer peripheral face of the side pressure bearing to apply a side pressure to the rotation shaft in a direction intersecting an axial direction of the rotation shaft;
    engaging parts which are formed in a frame to which the motor is fixed and with which both end portions of the urging member are respectively engaged; and
    a restricting part for restricting movement of the urging member toward the axial direction of the rotation shaft, the restricting part being provided at a position nearer to an abutting position where the urging member is abutted with the side pressure bearing between an engaging position where the urging member is engaged with each of the engaging parts and the abutting position of the urging member with the side pressure bearing.

2. The side pressure applying mechanism for a motor according to claim 1, wherein the restricting part is formed by means of that a part of the frame is cut and bent.

3. The side pressure applying mechanism for a motor according to claim 2, wherein a tip end portion of the restricting part is formed with a detachment preventing part which is bent toward an opposite direction to a bending direction of the restricting part that is formed by bending the frame.

4. The side pressure applying mechanism for a motor according to claim 2, wherein
   a tip end portion of the restricting part is provided so as to permit movement of the urging member in the axial direction of the rotation shaft, and
   a movable distance of the urging member in the axial direction is set to be smaller than a distance with which the urging member climbs on the side pressure bearing when the urging member is moved in the axial direction of the rotation shaft.

5. The side pressure applying mechanism for a motor according to claim 4, wherein
   the urging member is a wire spring which is formed of a metal wire,
   the side pressure bearing is provided with a large diameter part having a relatively large diameter and a small diameter part having a relatively small diameter which is formed on the large diameter part, and
   the wire spring is abutted with the small diameter part.

6. The side pressure applying mechanism for a motor according to claim 5, wherein the movable distance in the axial direction of the urging member which is restricted by the tip end portion of the restricting part is set to be smaller than a thickness in the axial direction of the small diameter part of the side pressure bearing.

7. The side pressure applying mechanism for a motor according to claim 2, wherein
   the restricting part is bent from the frame on a same side as the rotation shaft with respect to the urging member, and
   a tip end portion of the restricting part is formed toward a side opposite to an applying direction of the side pressure by the urging member.

8. The side pressure applying mechanism for a motor according to claim 7, wherein the restricting part is formed so that the tip end portion is formed toward an outer side in a radial direction of the rotation shaft.

9. The side pressure applying mechanism for a motor according to claim 2, wherein
   the restricting part is bent from the frame on an opposite side to the rotation shaft with respect to the urging member, and
   a tip end portion of the restricting part is formed toward a same side as an applying direction of the side pressure by the urging member.

10. The side pressure applying mechanism for a motor according to claim 9, wherein the restricting part is formed so that the tip end portion is formed toward an inner side in a radial direction of the rotation shaft.

11. The side pressure applying mechanism for a motor according to claim 9, wherein the restricting part is formed so that an outer face of the restricting part is inclined toward a tip end of the restricting part.

12. The side pressure applying mechanism for a motor according to claim 1, wherein
   the engaging parts with which both end portions of the urging member are respectively engaged are formed on outer sides of a motor case that structures the motor, and
   the restricting part is formed on an inner side with respect to a half position of an outer diameter of the motor case.

13. The side pressure applying mechanism for a motor according to claim 12, wherein
   the restricting part is bent from the frame on a same side as the rotation shaft with respect to the urging member, and
   a tip end portion of the restricting part is formed toward a side opposite to an applying direction of the side pressure by the urging member.

14. The side pressure applying mechanism for a motor according to claim 12, wherein
   the restricting part is bent from the frame on an opposite side to the rotation shaft with respect to the urging member, and
   a tip end portion of the restricting part is formed toward a same side as an applying direction of the side pressure by the urging member.

* * * * *